2,661,510

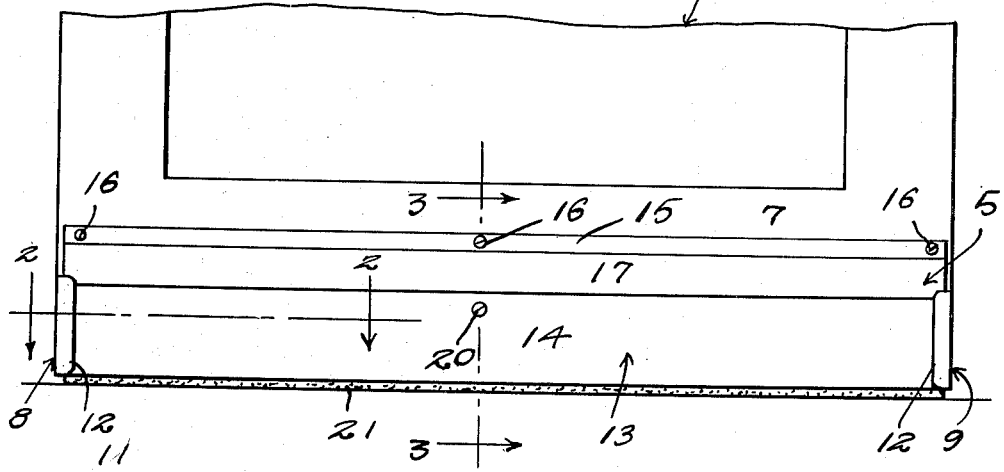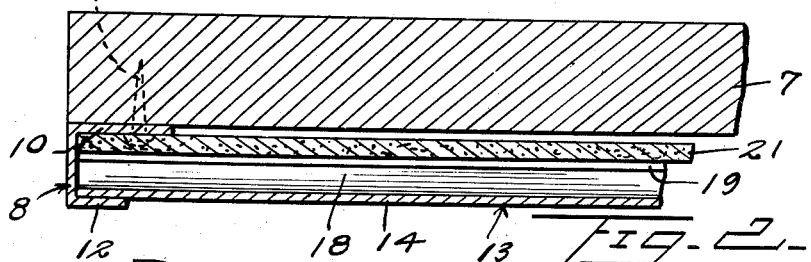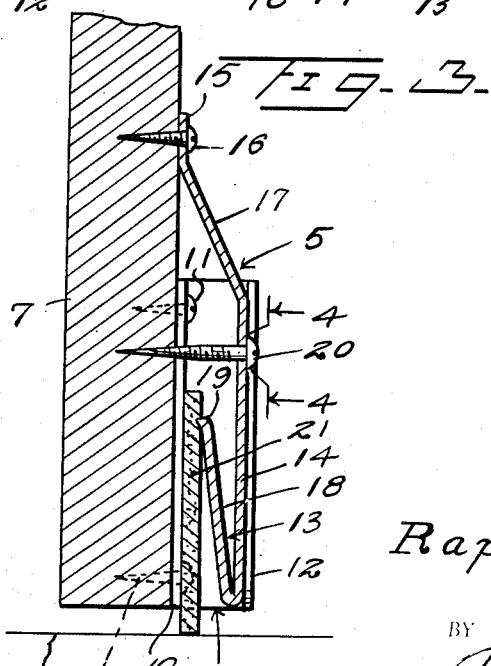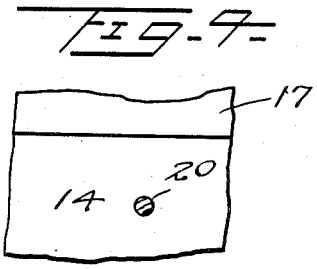
INVENTOR
Raphael J. Folse
BY John H. Randolph
ATTORNEY Patented Dec. 8, 1953

UNITED STATES PATENT OFFICE 2,661,510

WEATHER STRIP MOUNTING FOR CLOSURES

Raphael J. Folse, New Orleans, La.

Application July 9, 1952, Serial No. 297,852

6 Claims. (Cl. 20—69)

1

This invention relates to a novel mounting unit of extremely simple construction primarily adapted for mounting a piece of weather stripping detachably against an inner or outer side of a closure such as a door and so that the bottom edge portion of the weather stripping will protrude downwardly from the bottom edge of the door to engage a floor or sill surface disposed therebeneath to form an air seal between said surface and the bottom edge of the closure.

More particularly, it is an aim of the present invention to provide a novel weather strip mounting by means of which the weather strip may be advanced downwardly or retracted upwardly without being removed from the mounting and without detaching the mounting from the closure and thereby afford a means for effectively maintaining the weather strip with its bottom edge properly positioned to engage a surface disposed beneath a closure and to seal the space between said surface and the closure.

Still a further object of the invention is to provide a weather strip mounting composed of a minimum of parts capable of being quickly applied to or removed from a closure and which will not detract from the appearance of the closure.

Another object of the invention is to provide a weather strip mounting which will resiliently engage the weather strip supported thereby adjacent an upper edge thereof to minimize damage to the weather strip in moving across, into and out of engagement with a surface disposed beneath the closure, and for yieldably positioning the weather strip relatively to the closure.

Numerous other objects and advantages of the invention will hereinafter become more fully apparent from the following description of the drawing, illustrating a presently preferred embodiment thereof, and wherein:

Figure 1 is a front elevational view showing the invention in an applied position;

Figure 2 is an enlarged longitudinal sectional view thereof, taken substantially along a plane as indicated by the line 2—2 of Figure 1;

Figure 3 is an enlarged cross sectional view thereof taken substantially along a plane as indicated by the line 3—3 of Figure 1, and Figure 4 is a fragmentary sectional view partly in elevation on an enlarged scale, taken substantially along a plane as indicated by the line 4—4 of Figure 3.

Referring more specifically to the drawing, the weather strip mounting constituting the invention is designated generally 5 and is illustrated in the drawing in an applied position on one side of the bottom bar or rail of a closure. The lower portion only of the closure is illustrated and designated generally 6 having the bottom bar 7 to one side of which the weather strip mounting 5 is detachably fastened. It will become apparent as the description proceeds that the mounting unit 5 may be mounted on either the inner or outer side of the closure.

The mounting unit 5 includes a pair of corresponding inwardly facing channel members 8 and 9 which are adapted to be disposed adjacent the ends of the bottom bar or rail 7 of the closure 6 and each of which has an inner flange or side 10 which engages against a side of the bar or rail 7 and is secured thereto by suitable fastenings 11 which extend therethrough and are anchored in the bar 7. The inner flanges 10 are preferably wider than the outer flanges 12 of the channels 8 and 9, so that the fastenings 11 may be disposed beyond the inner edges of the outer flanges 12 to enable a tool to be readily applied thereto for anchoring the fastenings in the bar 7 or for removing the fastenings therefrom, as shown in Figure 2.

The weather strip mounting also includes an elongated metal plate or strip, designated generally 13, having a portion 14, disposed intermediate of its longitudinal edges, which extends longitutinally of the bar 7 and the ends of which intermediate portion 14 engage in the channels 8 and 9 and normally bear against the inner sides of the outer flanges 12 thereof, as best illustrated in Figure 2. The strip or plate 13 includes an upper longitudinal edge portion 15 which is inwardly offset relatively to said intermediate portion 14 and which is disposed against the closure portion 7 and secured thereto by a plurality of fastenings 16. The upper edge portion 15 is disposed substantially above the level of the upper ends of the channel members 8 and 9 and the strip 13 includes a portion extending from end-to-end thereof which is disposed at an oblique angle to the portions 14 and 15 and which extends between and is formed integral with adjacent longitudinal edges of said portions 14 and 15. Said last mentioned, oblique portion 17 is inclined upwardly and inwardly from the upper edge of the intermediate portion 14 relatively to the adjacent side of the closure 6. The other longitudinal edge portion 18 of the strip 13 extends upwardly and inwardly from the other bottom longitudinal edge of said intermediate portion 14 and is disposed normally at a slight angle to the intermediate portion 14 and extends upwardly and inwardly toward the adjacent side of the bottom bar or rail 7. Said last mentioned upturned portion 18 likewise extends from end-to-end of the strip 13 and has its end portions disposed within the channel members 8 and 9 between the flanges 10 and 12 thereof. The upper longitudinal edge 19 of the portion 18 is preferably disposed at a level substantially above the lower ends of the channel members 8 and 9 and beneath the upper ends of said channel members and said portion 18 is spring biased by the resiliency of the strip 13 away from said intermediate portion 14 and toward the closure 6 so that the end portions of the upper edge 19 thereof would normally abut against the inner flanges 10 of the channels 8 and 9. A relatively long fastening 20 extends through said intermediate portion 14, intermediate of the ends thereof and is anchored in the bar 7, the fastening 20 being disposed above the level of said upper edge 19. The channels 8 and 9, the strip 13 and the fastenings attaching said channels and strip to the closure portion 7 constitute all of the elements forming the weather strip mounting 5.

A weather strip 21 which may be formed of felt, sponge rubber or other suitable material which is preferably relatively flexible, is mounted in and supported by the mounting 5. The strip 21 is of a length to extend substantially from end-to-end of the mounting 5 so that the end portions thereof will be disposed in the channels 8 and 9. The strip 21 is of a width to extend from below the bottom edge of the mounting 5 to above the upper edge 19 of the portion 18. Said resilient portion 18 is displaced away from the inner flanges 10 and the bar 7 by the weather strip 21 so that the portion 18 is thus tensioned and spring biased toward the bar 7, so that the upper edge 19 thereof will press into the weather strip 21, near to but spaced from its upper edge for clamping the end portions thereof between said edge 19 and the flanges 10, as illustrated in Figures 2 and 3. It will thus be noted that the weather strip 21 is clamped in the mounting unit 5 substantially above its bottom edge and substantially above the bottom edge of said unit 5 and the closure 6. The bottom edge portion of the weather strip 21 extends downwardly from the open bottom of the mounting unit 5 a desired distance so that said bottom edge of the weather strip 21 will engage a sill surface or floor surface 22 over which the closure 6 is disposed when in a closed position to seal the space existing between the bottom edge of the closure and said surface 22, as best illustrated in Figure 3.

By clamping the strip 21 in the unit 5 adjacent its upper edge, said strip may readily flex parallel to its longitudinal axis to prevent damage thereto in moving across, into and out of engagement with the surface 22. It will also be apparent that any suitable tool may be inserted upwardly into the unit 5 between its resilient clamping portion 18 and the strip 21 for displacing said portion 18 away from the strip to enable the strip to be adjusted upwardly or downwardly in the mounting unit 5 without dismantling any of the parts. As soon as pressure is released from said clamping portion 18 it will be spring biased by its resiliency toward the strip 21 for re-clamping said weather strip in its readjusted position. Obviously, the weather strip 21 may be wider than illustrated to extend to above the position of its upper edge in Figure 3, and if desired, the fastening 20 may be omitted or positioned closer to the level of the upper ends of the channels 8 and 9 to accommodate wider weather strips 21.

It will also be apparent that the mounting unit 5 may be quickly applied to or removed from either side of the bottom bar or rail 7 of a closure and is so constructed that it will not detract from the appearance of the closure, yet possesses a maximum of functional utility in sealing the space beneath a closure to prevent the passage of air therethrough.

Various modifications and changes are contemplated and may obviously be resorted to, without departing from the spirit or scope of the invention as hereinafter defined by the appended claims.

I claim as my invention:

1. The combination with a closure and a weather strip for sealing a space between a bottom edge of the closure and a surface disposed therebeneath, of a weather strip mounting unit demountably and adjustably supporting said weather strip on one side of the closure and adjacent the bottom edge thereof, said mounting unit including inwardly opening corresponding channel members secured to one side of the bottom portion of the closure and adjacent the opposite side edges thereof, an elongated strip of metal including an intermediate strip portion extending from end-to-end of said strip and spaced from longitudinal edges thereof, said intermediate strip portion having the end portions thereof engaging in said inwardly opening channel members, said strip having an upper longitudinal edge portion extending upwardly from said intermediate strip portion and from said channel members, means for securing said upper edge portion of the strip to the closure for supporting said intermediate strip portion in engagement with the channel members, and said strip including a turned back bottom edge portion extending upwardly from the lower edge of said intermediate strip portion and having the end portions thereof disposed in said channel members, said last mentioned portion forming a clamping strip and being disposed on the inner side of said intermediate strip portion and being spring biased toward the closure, said weather strip being disposed with its ends engaging in said channel members and between said closure and said clamping portion, the upper free edge of said clamping portion yieldably bearing against a longitudinal portion of the weather strip for clamping the weather strip between said clamping strip and the inner flanges of said channel members for supporting the bottom edge of the weather strip at a desired level below the bottom edge of the closure and in engagement with the surface disposed beneath the closure for sealing the space between said surface and the closure.

2. A weather strip mounting as in claim 1, the upper weather strip engaging edge of said clamping portion being disposed substantially above the level of the bottom edge of the closure to facilitate flexing of the weather strip when moved with the closure and when in frictional engagement with the surface disposed beneath the closure.

3. A weather strip mounting unit as in claim 1, said metal strip having an upwardly and inwardly inclined portion extending from the upper edge of said intermediate strip portion and from the upper ends of said channel members toward and into engagement with the side of the closure on which the mounting unit is disposed.

4. The combination with a closure and a flexible weather strip for sealing the space between the bottom edge of the closure and a surface disposed therebeneath, of a weather strip mounting unit comprising an elongated clamping member including an outer base portion spaced outwardly from one side of said closure and extending transversely of said side and an inner clamping portion extending upwardly and inwardly from a bottom edge of said base portion and extending from end-to-end thereof, said inner clamping portion being spring biased away from the outer base portion toward the adjacent side of the closure, said weather strip being disposed between said clamping portion and the adjacent side of the closure and being engaged and clamped by the upper edge of said clamping portion for supporting the weather strip between the closure and clamping portion and with the bottom edge of the weather strip extending downwardly from the closure and clamping member to engage the surface disposed therebeneath, and means detachably fastening said clamping member to the closure.

5. A weather strip mounting as in claim 4, said means for attaching the clamping member to the closure including fastenings engaging the clamping member and closure above the upper edge of said inner clamping portion.

6. A weather strip mounting as in claim 4, said means for attaching the clamping member to the closure including inwardly opening channel members secured to the closure adjacent the side edges thereof and in which the end portions of the base portion and clamping portion of said clamping member are disposed, said inner clamping portion being yieldably movable out of engagement with the weather strip and toward the base portion for adjusting the weather strip upwardly or downwardly in the mounting unit, and said clamping portion being spring biased by its resiliency back into clamping engagement with the weather strip when released to retain the weather strip in its adjusted position.

RAPHAEL J. FOLSE.

References Cited in the file of this patent

UNITED STATES PATENTS

| Number | Name | Date |
|---|---|---|
| 1,182,626 | Benedict | May 9, 1916 |
| 1,612,609 | Cherry | Dec. 28, 1926 |
| 1,687,666 | Harnly | Oct. 16, 1928 |